United States Patent
Fogagnolo

(10) Patent No.: US 6,862,978 B1
(45) Date of Patent: Mar. 8, 2005

(54) COFFEE MAKING MACHINE

(75) Inventor: Armando Fogagnolo, Milan (IT)

(73) Assignee: Rancilio Macchine per Caffe SpA, Milan (IT)

( * ) Notice: Subject to any disclaimer, the term of this patent is extended or adjusted under 35 U.S.C. 154(b) by 83 days.

(21) Appl. No.: 10/110,667

(22) PCT Filed: Sep. 25, 2000

(86) PCT No.: PCT/EP00/09462

§ 371 (c)(1),
(2), (4) Date: Dec. 9, 2002

(87) PCT Pub. No.: WO01/26519

PCT Pub. Date: Apr. 19, 2001

(30) Foreign Application Priority Data

Oct. 14, 1999 (IT) ........................................ TO99A0892

(51) Int. Cl.[7] .............................................. A47J 31/00
(52) U.S. Cl. .............................. 99/279; 99/284; 99/290
(58) Field of Search ......................... 99/279, 284, 290, 99/288; 312/257.1, 228

(56) References Cited

U.S. PATENT DOCUMENTS

| 4,256,030 A | 3/1981 | de Bruin et al. ............... 99/295 |
| 5,217,288 A | 6/1993 | Johnson ....................... 99/284 |

FOREIGN PATENT DOCUMENTS

| FR | 1382674 A | 12/1964 |
| FR | 2621804 | 4/1989 |

*Primary Examiner*—Reginald L. Alexander
(74) *Attorney, Agent, or Firm*—Paul & Paul

(57) ABSTRACT

An espresso coffee making machine, comprising a bearing structure formed by a monolithic cradle (2), made of plastic material and equipped with fastening means and/or compartments for housing a water heating boiler, a compression and pumping group, possibly other internal components, and with a basin for collecting liquids, and by a metal frame (4) that is coupled to the monolithic cradle (2) and is arranged to support one or more coffee delivery groups, the electric and hydraulic control members of the machine and a plurality of external covering panels (28, 32, 34, 35, 36, 30) of plastics and/or metal.

18 Claims, 3 Drawing Sheets

COFFEE MAKING MACHINE

BACKGROUND OF THE INVENTION

The present invention concerns a machine for making espresso coffee.

More particularly, the invention concerns a machine of professional or domestic kind for making espresso coffee, said machine comprising at least a steam boiler, a water pressurising device, one or more coffee delivery groups and other internal or external fittings, assembled within an external structure or casing.

Prior art coffee making machines include an external bearing structure made of bent and painted metal plate and comprising multiple sheets joined together by means of screws, rivets, by welding or other similar fastening systems. All internal fittings of the machine are fastened to such a structure, which also acts as support for the external fittings.

Assembling a coffee making machine of that kind comprises the steps of assembling first the external structure, by joining together the metal plate panels previously prepared and painted, and then fastening and connecting together the various internal hydraulic components, the electrical wiring, the control unit and the front control members of the machine. The assembling is then completed by applying a rear panel, also of stamped plate, which allows at any moment access to the internal components of the machine.

A metal plate structure for a coffee making machine thus comprises multiple panels, which must be individually cut, stamped and painted. In order to bear the weights and the loads of the internal components, the metal plate to be used must be rather thick, in order to give the machine a structural robustness. Such a structure is then heavy and difficult to assemble and it does not favour, but rather it is of hindrance for, the assembling and possible maintenance of the internal components of the machine.

Moreover, the painting step, on which the external appearance of the machine depends, considerably affects production costs.

Document U.S. Pat. No. 5,217,288 illustrates a beverage brewer which can be assembled without tools from a plurality of component parts and subassemblies. The brewer includes a metal plate structure made of a base wall, a three-sided housing, a top wall and a removable front panel. Internal component parts are attached to the metal plate structure by means of mechanical means.

SUMMARY OF THE INVENTION

A first object of the present invention therefore is to obtain a coffee making machine, for professional or domestic use, having a bearing structure that is easy to assemble, robust, light and cheap and that does not require special external finishing. Thanks to the reduced number of components, production and assembling times are considerably reduced.

Moreover, in case of failures or maintenance, the coffee making machine made in accordance with the invention can be readily opened, disassembled and repaired.

The above and other objects of the invention are attained by the coffee making machine made in accordance with the invention, as claimed in the appended claims.

The bearing structure for coffee making machines made in accordance with the invention can advantageously be used in both professional machines and machines for domestic use.

BRIEF DESCRIPTION OF THE DRAWINGS

The above and other objects of the invention will become more apparent from the description of a preferred embodiment, with reference to the accompanying drawings, in which.

DETAILED DESCRIPTION OF THE INVENTION

Figure 1:
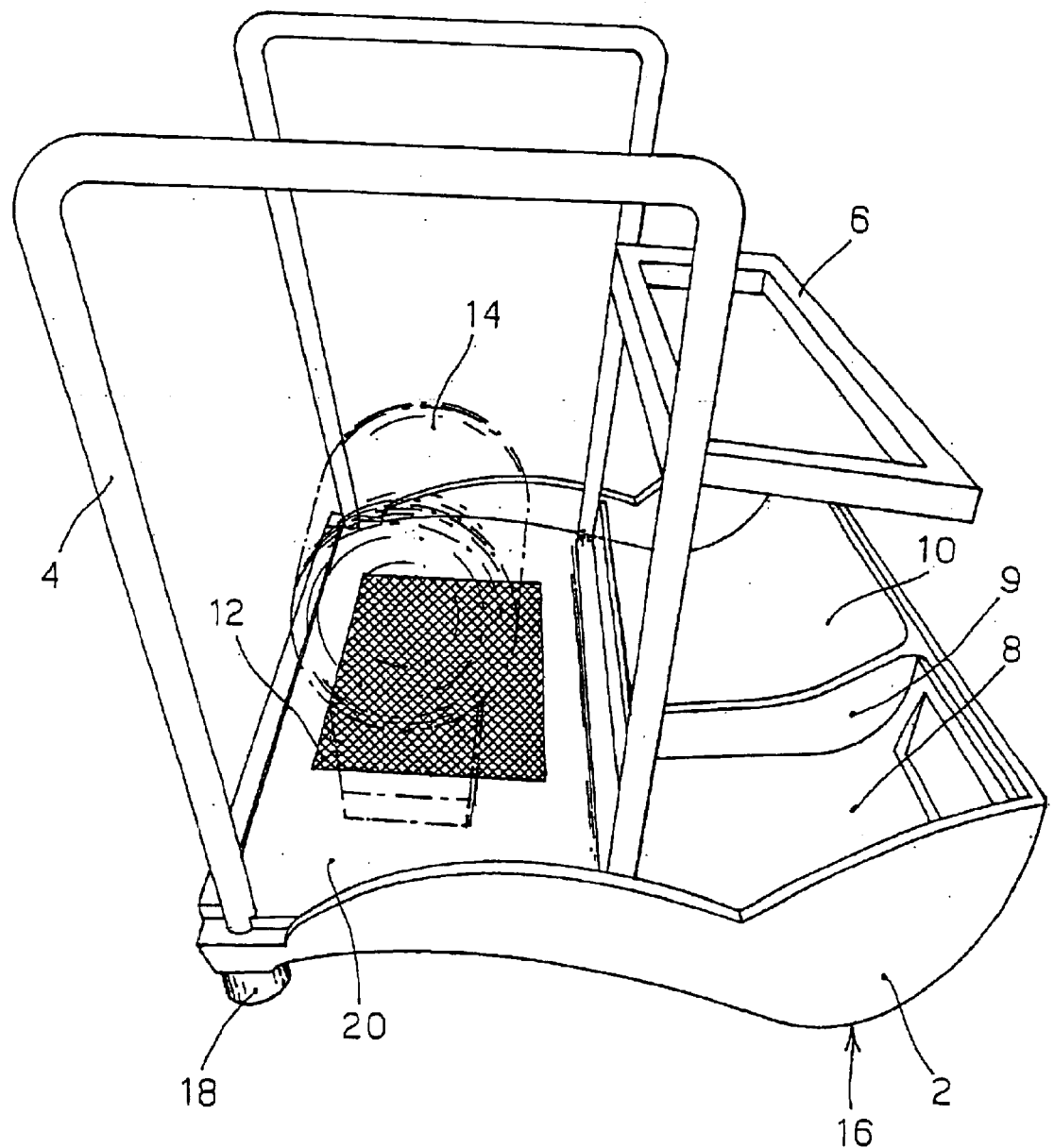
FIG. 1 is a perspective view of a bearing structure for a coffee making machine made in accordance with the present invention.

Referring to FIG. 1, a bearing structure for a coffee making machine comprises a monolithic cradle 2, made of plastic material, coupled to a frame 4 made of metal tubes.

Figure 2:
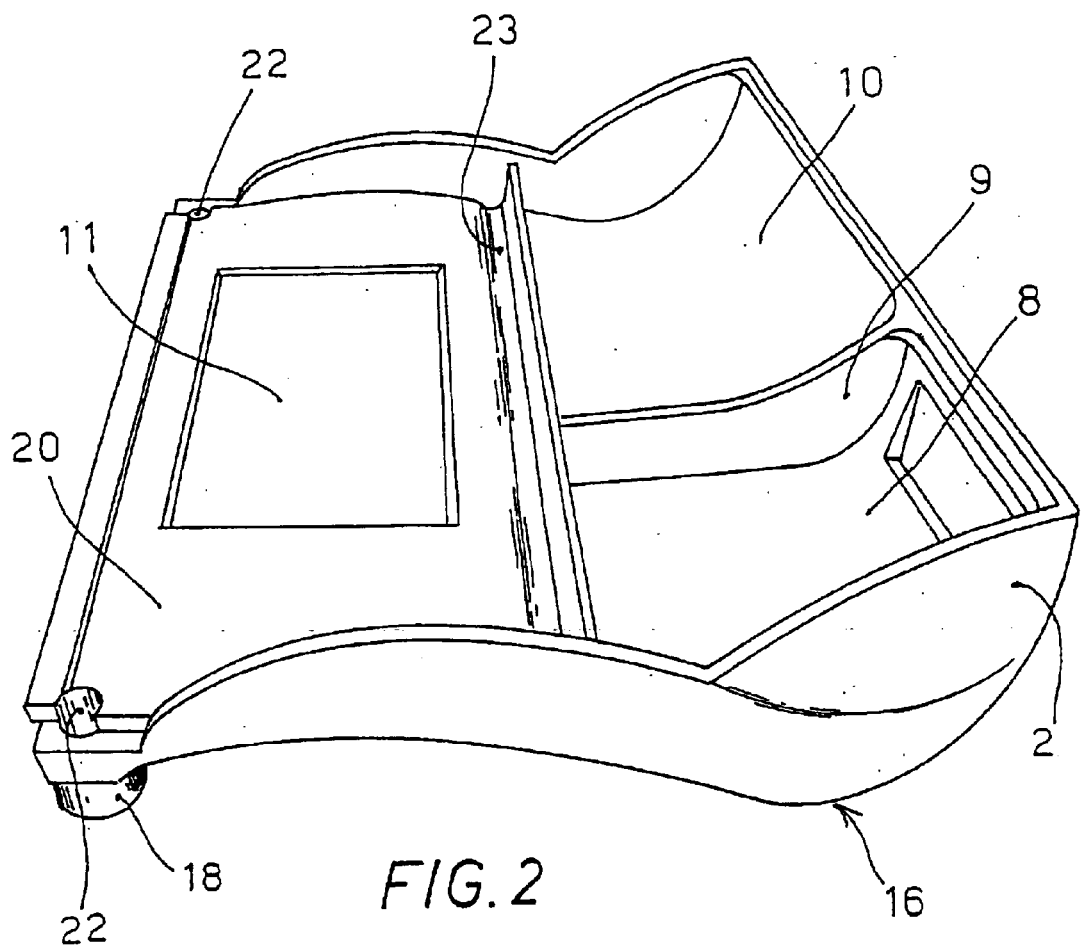
FIG. 2 is a first perspective view of a monolithic cradle of a bearing structure made in accordance with the present invention.
Figure 3:
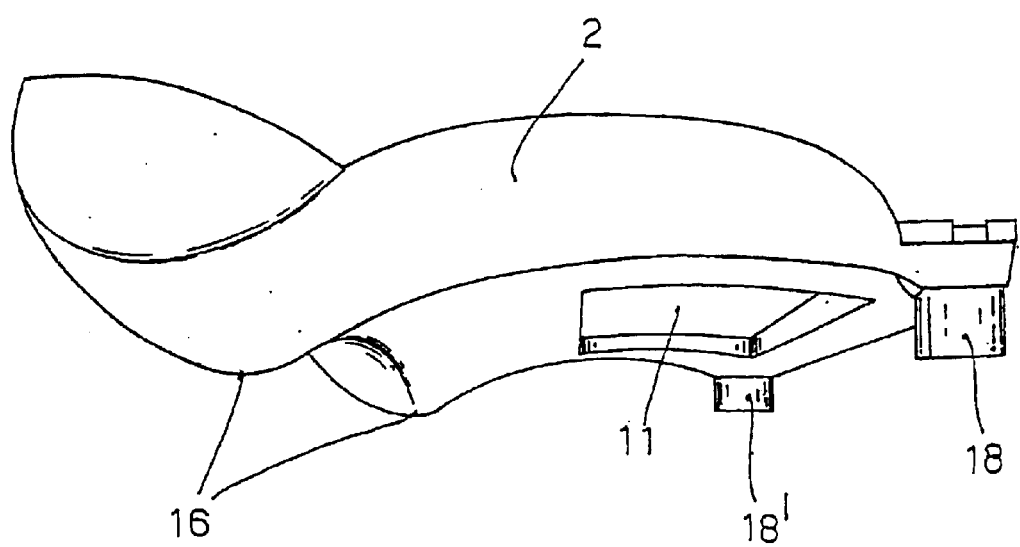
FIG. 3 is a second perspective view of a monolithic cradle of a bearing structure made in accordance with the present invention.

Monolithic cradle 2, shown in detail in FIGS. 2 and 3, comprises an internal portion 20 equipped with fastening means and/or compartments for housing a boiler 14, schematically shown in FIG. 1, and other internal components, such as for instance a compression and pumping group, and electrical or electronic control unit, valves, tubes and connection cables. Those components are not shown in the drawings but they are present in any coffee making machine.

A second portion of monolithic cradle 2 comprises, in the present embodiment, a first basin 8 for housing hydraulic components, and a second basin 10 for collecting liquids. The basins are separated by a partition 9 and are located in the front part of the machine, in correspondence with the coffee delivery zone and the devices for generating hot water and steam. The shapes and the number of the front basins can be varied in dependence of the machine model, since they can be easily modified by acting on the mould used to produce cradle 2.

Monolithic cradle 2 in effect is integrally moulded in a single step, by using a polymeric material that preferably is coloured. Thus the cradle does not require a special finishing, it needs not to be painted and it is at the same time light and particularly robust.

Two front support feet 16 are embodied in the front part of monolithic cradle 2, whereas two rear support feet 18, preferably made of metal, are applied to the cradle bottom. The rear feet assist in supporting metal tube frame 4, as shown in FIG. 1. An opening 11 in the bottom of cradle 2, arranged to receive a grid 12, makes air inlet into the machine easier, to create a controlled chimney and heat exchange effect assisting in heating an upper heating plane.

Monolithic cradle 2 mainly acts as a support base for all internal components of the machine, which can be assembled in layers, with the maximum operating freedom, thanks to the absence of frame 4 during the initial assembling steps of the machine.

Actually, frame 4 of metal tubes is applied to monolithic cradle 2 after mounting all main components on the cradle, by laying the frame into properly arranged sets 22, 23 and by securing it by mechanical fastening means, screws, bolts and/or gluing.

Frame 4 comprises a single tube that is bent several times by 90° so as to form a very light, robust and cheap to manufacture parallelepiped structure. A secondary frame 6, secured to the front part of frame 4 e.g. by welding, bears the coffee delivery groups, a possible steam delivery group and possible front control members of the machine.

In alternative, frame 4 can be made by welding together lengths of metal bars with square, rectangular or round cross-section, so as to form a parallelepiped structure similar to that shown in FIG. 1.

Figure 4:
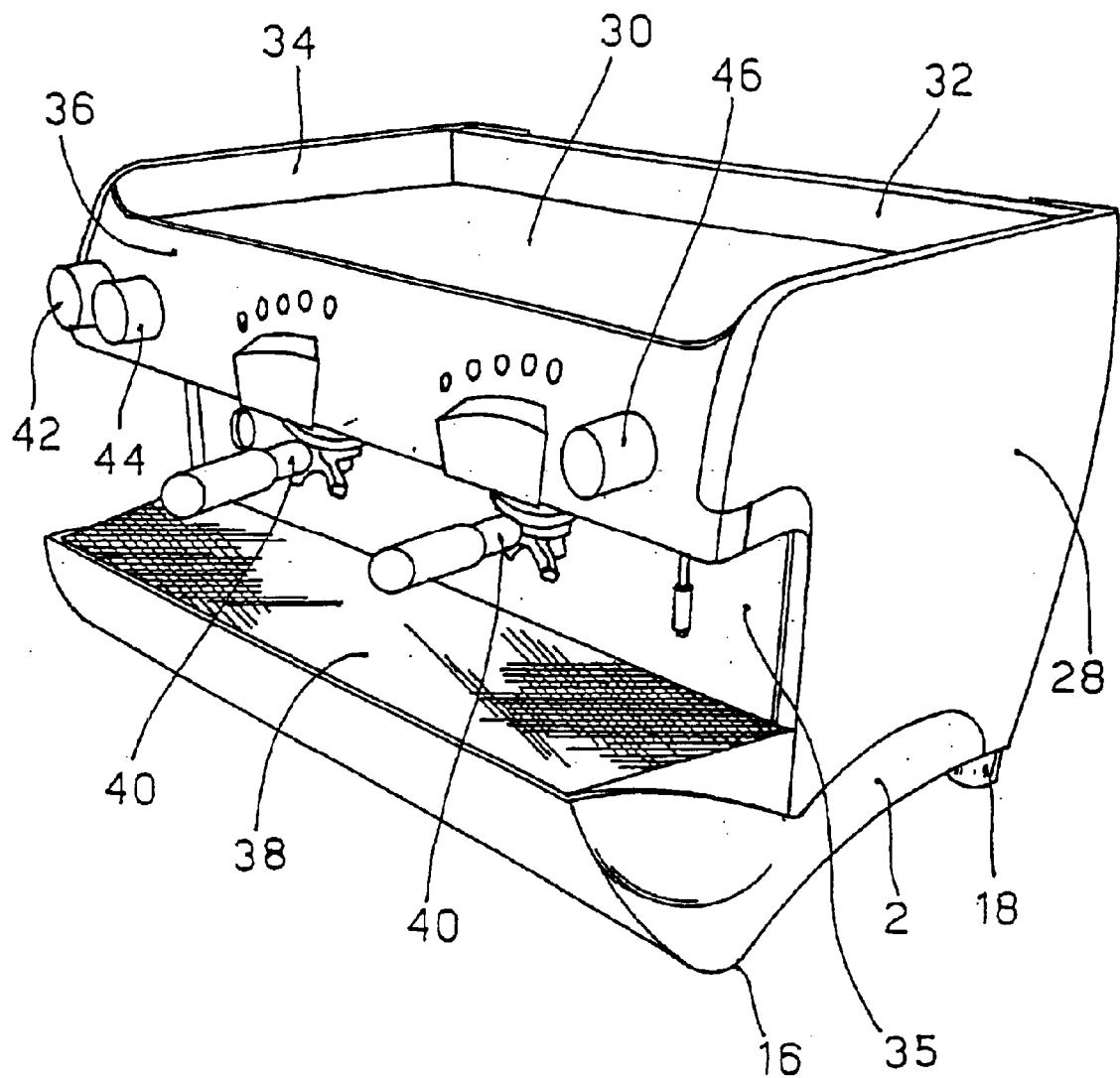
FIG. 4 is a perspective view of a coffee making machine made in accordance with the present invention.

As shown in FIG. 4, which shows a complete coffee making machine made in accordance with the present invention, a plurality of external covering panel (casing) is then applied to the metal tube frame 4. Some panel, such as side panels 28 and 34, rear panel 32 and front panel 36, may be made of plastics, by moulding a coloured polymeric material, since they have no bearing functions but only aesthetic functions. Such panel therefore do not require painting, they are light and they can be easily made, replaced and recycled.

Other panels, such as upper panel 30 and lower front panel 35, are on the contrary made of stainless steel, for hygienic reasons and in order to allow an easy and efficient cleaning.

A grid 38 closes liquid collecting basins 8, 10 at their upper parts, while allowing passage of possible coffee waste or other liquids.

Possibly, monolithic cradle 2 can also incorporate part of the side or rear panels, thereby allowing particular combinations of colours and/or materials that may contribute to an aesthetic characterisation of the machine.

The plastic material used for monolithic cradle 2 and external panels 28, 32, 34 further allows optimum ergonomic performance, by creating, for instance, non-hurting surfaces and two side recesses for the hands to make the machine transport easier.

The bearing structure described above can be used in coffee making machines of professional or domestic type and even in super-automatic coffee making machines, i.e. machines in which the preparation, delivery and filter washing operations are carried out in wholly automatic manner.

The method of assembling a coffee making machine made in accordance with the present invention thus comprises the following steps:

securing water-heating boiler 14, the compression and pumping group and other internal fittings onto said monolithic cradle 2 of plastic material;

securing the electric and hydraulic control members and said one or more coffee delivery groups onto said metal frame 4;

joining said monolithic cradle 2 and said metal frame 4 together;

connecting the components present on cradle 2 with the components present on cradle 2 with the components present on frame 4 by means of hydraulic and electric connections;

securing to the frame a plurality of external covering panels.

What is claimed is:

1. An espresso coffee making machine comprising a plurality of components including a boiler (14) for heating water, a compression and pumping group, valves, hydraulic and electric control members and at least one coffee delivery group, and comprising a bearing structure arranged to house and/or support said plurality of components, characterised in that said bearing structure comprises:

a support base consisting of a monolithic plastic cradle (2);

a tubular frame (4, 6) applied to said monolithic cradle (2); some of said components being housed by said cradle (2) and some being supported by said frame (4, 6).

2. A coffee making machine according to claim 1, wherein said monolithic cradle (2) is equipped with fastening means and/or compartments for housing said compression and pumping group.

3. A coffee making machine according to claim 1, wherein said monolithic cradle (2) is equipped with at least one basin (8, 10) for collecting liquids, located in correspondence with said at least one coffee delivery group.

4. A coffee making machine according to claim 1, wherein said monolithic cradle (2) comprises at least two front support feet (16).

5. A coffee making machine according to claim 1, wherein said monolithic cradle (2) is obtained by moulding a coloured polymeric material.

6. A coffee making machine according to claim 1, wherein said tubular frame (4, 6) is secured to said monolithic cradle (2) through mechanical securing means and/or by gluing.

7. A coffee making machine according to claim 6, wherein said at least one coffee delivery group is secured to said tubular frame (4, 6).

8. A coffee making machine according to claim 1, wherein said tubular frame (4, 6) is of parallelepiped structure.

9. A coffee making machine according to claim 1, wherein said tubular frame (4, 6) is made of metal tubes.

10. A coffee making machine according to claim 1, comprising a plurality of panels, including front (35, 36), rear (32) side (28, 34) and upper (30) panels, secured to said tubular frame (4).

11. A coffee making machine according to claim 10, wherein one or more of said panels are made of plastic material.

12. A coffee making machine according to claim 1, wherein each side (28, 34) and/or rear (32) wall is formed partly by one of said panels and partly by a portion of said monolithic cradle (2).

13. A coffee making machine according to claim 1, wherein said monolithic cradle (2) comprises two side recesses for the hands, to make the machine transport easier.

14. A coffee making machine according to claim 1, wherein said monolithic cradle (2) comprises a grid (12) for air passage, located in correspondence with the water heating boiler.

15. A coffee making machine according to any preceding claim, characterised in that it is a super-automatic coffee making machine.

16. A method of assembling a coffee making machine according to any one of claims 1 to 11, characterised in that it comprises the following steps:
- providing a monolithic plastic cradle (2);
- providing a tubular frame (4, 6);
- securing some of said components onto said monolithic plastic cradle (2);
- securing some of said components onto said tubular frame (4, 6);
- joining said monolithic cradle (2) and said tubular frame (4) together.

17. A method according to claim 16, further comprising the following steps:
- connecting the components present on the cradle (2) and/or the components present on the frame (4) with corresponding hydraulic and electric connections;
- securing a plurality of external covering panels (28, 32, 34, 35, 36, 30) to the frame (4, 6).

18. A method according to claim 16, wherein the water heating boiler (14) and the compression and pumping group are secured onto said monolithic plastic cradle (2), and the electric and hydraulic control members and said at least one coffee delivery group are secured onto said tubular frame (4).

* * * * *